United States Patent
Kuramoto et al.

(10) Patent No.: US 7,936,314 B2
(45) Date of Patent: May 3, 2011

(54) DUAL POLARIZED ANTENNA

(75) Inventors: Akio Kuramoto, Minato-ku (JP); Hiroyuki Yusa, Minato-ku (JP)

(73) Assignee: NEC Corporation, Tokyo (JP)

( * ) Notice: Subject to any disclaimer, the term of this patent is extended or adjusted under 35 U.S.C. 154(b) by 313 days.

(21) Appl. No.: 12/305,540

(22) PCT Filed: Apr. 11, 2008

(86) PCT No.: PCT/JP2008/057136
§ 371 (c)(1),
(2), (4) Date: Dec. 18, 2008

(87) PCT Pub. No.: WO2008/133033
PCT Pub. Date: Nov. 6, 2008

(65) Prior Publication Data
US 2009/0251380 A1 Oct. 8, 2009

(30) Foreign Application Priority Data
Apr. 12, 2007 (JP) .................. 2007-104837

(51) Int. Cl.
*H01Q 1/38* (2006.01)
*H01Q 21/24* (2006.01)
(52) U.S. Cl. ......... 343/826; 343/725; 343/728; 343/853
(58) Field of Classification Search ........... 343/700 MS, 343/725, 728, 729, 795, 797, 826, 828, 829, 343/831, 844, 853, 893
See application file for complete search history.

(56) References Cited

U.S. PATENT DOCUMENTS 6,104,356 A * 8/2000 Hikuma et al. ............... 343/853
6,163,306 A * 12/2000 Nakamura et al. ............ 343/797

FOREIGN PATENT DOCUMENTS

| JP | 7-7321 A | 1/1995 |
| JP | 7-86825 A | 3/1995 |
| JP | 9-64639 A | 3/1997 |
| JP | 10-107533 A | 4/1998 |
| JP | 2003-514422 A | 4/2003 |
| JP | 2003-347822 A | 12/2003 |
| JP | 2005-94088 A | 4/2005 |
| JP | 2005-167705 A | 6/2005 |
| JP | 2008-512940 A | 4/2008 |
| WO | 2006031276 A1 | 3/2006 |

* cited by examiner

*Primary Examiner* — Michael C Wimer
(74) *Attorney, Agent, or Firm* — Sughrue Mion, PLLC

(57) ABSTRACT

To provide a dual polarized antenna capable of reducing correlation between antenna elements.

A dual polarized antenna is constituted by a vertically polarized antenna and a horizontally polarized antenna formed on a printed circuit board and radiates two kinds of polarized waves. The vertically polarized antenna has a configuration in which: a first microstripline is extended along the longitudinal direction of the printed circuit board from the lower portion of the printed circuit board; a first conductive radiating element is disposed at one end of the first microstripline; a phase delay circuit is serially connected to the first conductive radiating element; a second conductive radiating element is added to one end of the phase delay circuit; and a third conductive radiating element is added to a ground conductor which is disposed on the rear side of the surface of the printed circuit board on which the first conductive radiating element and first microstripline are connected at a corresponding portion thereof.

13 Claims, 5 Drawing Sheets

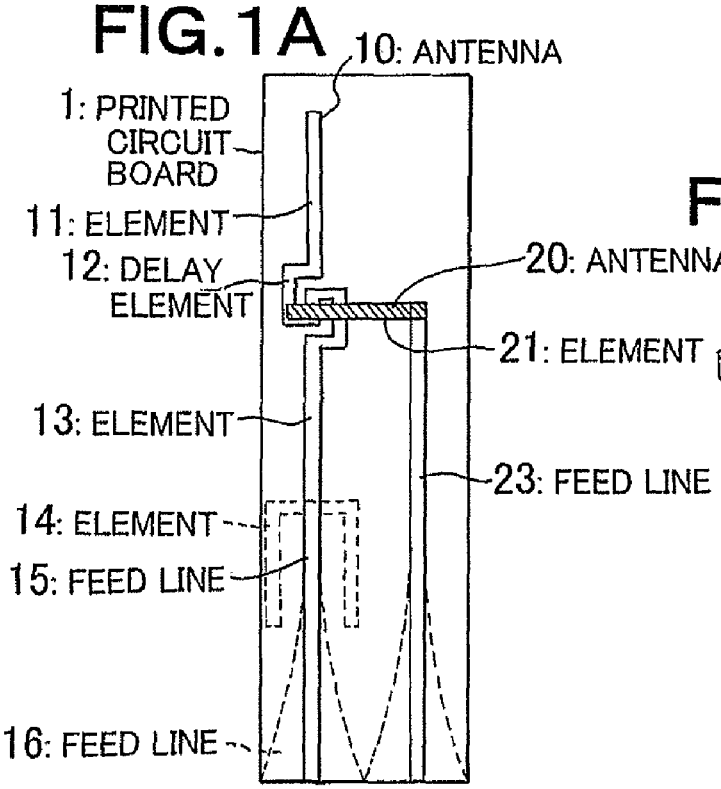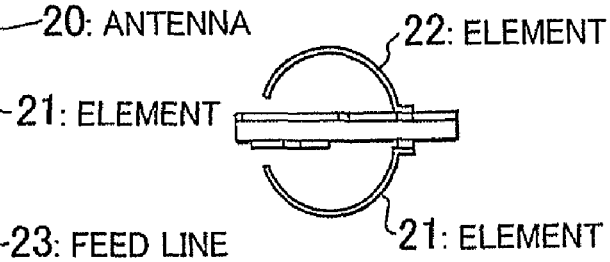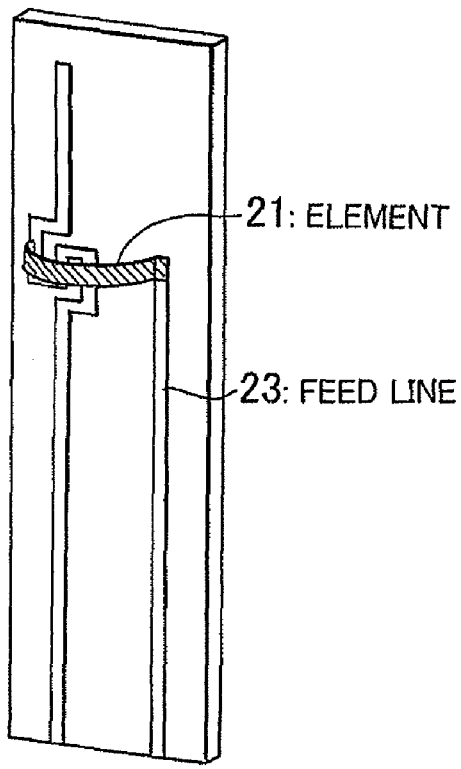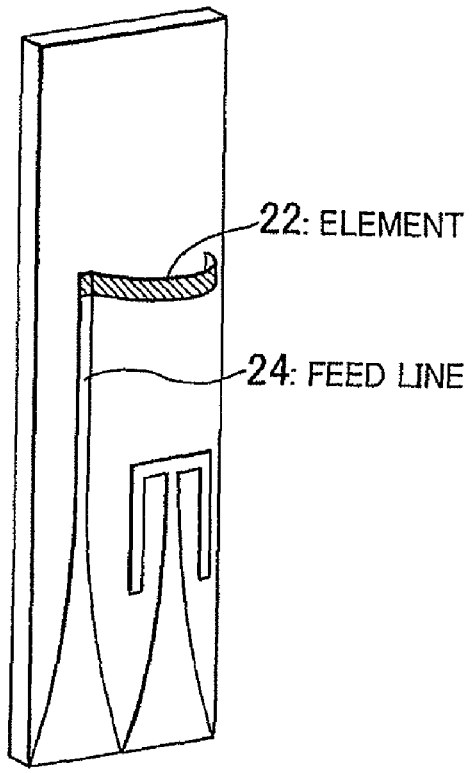

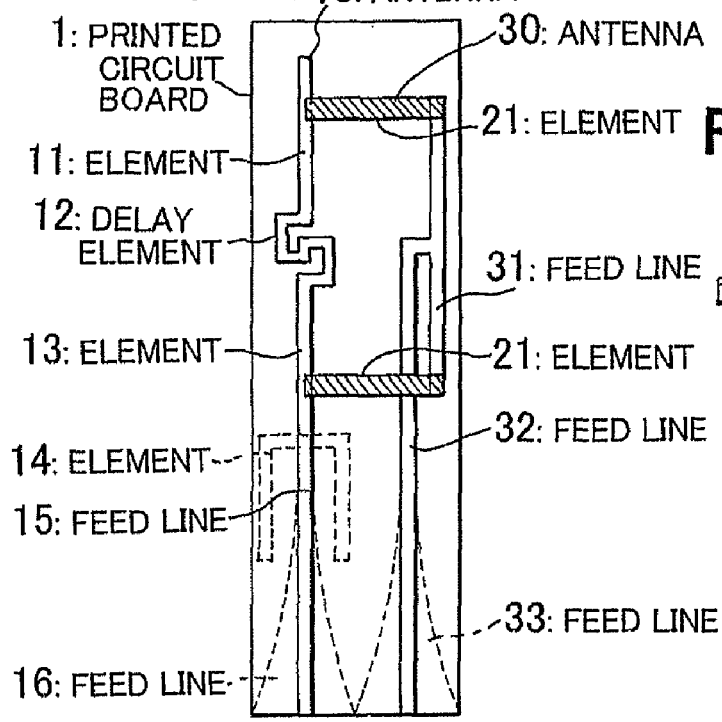
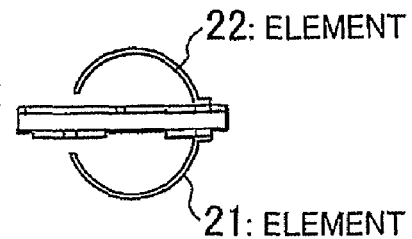
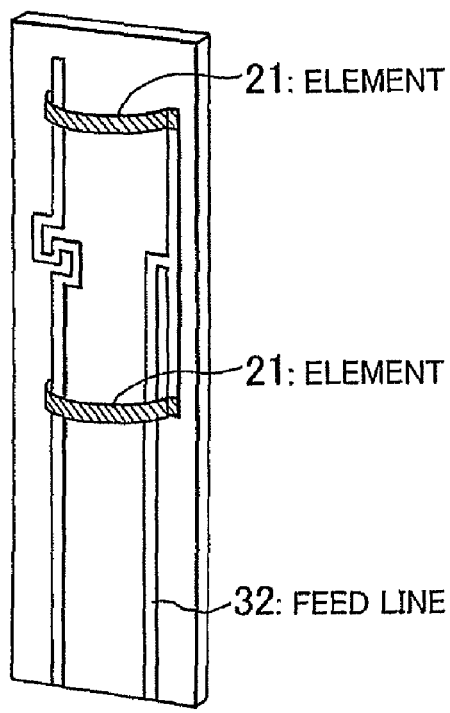
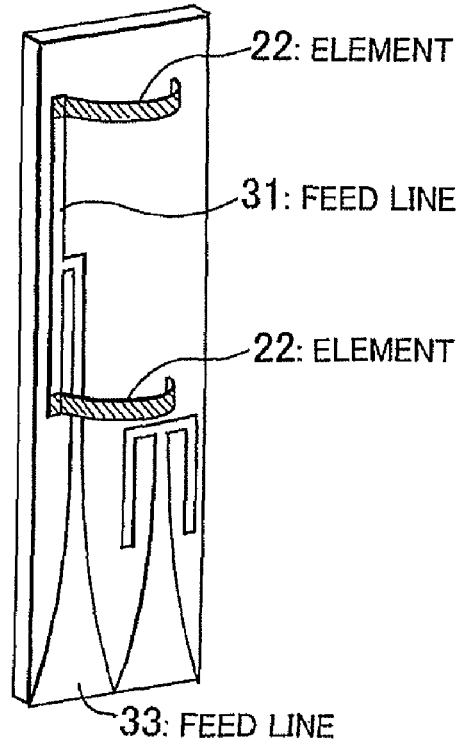

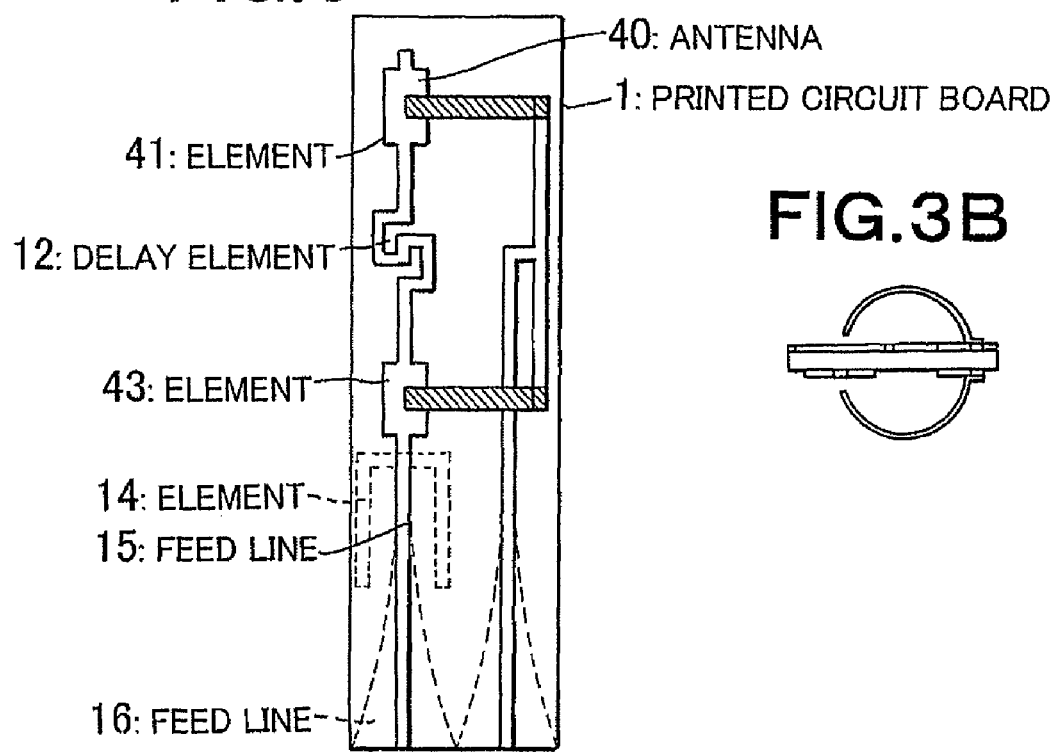
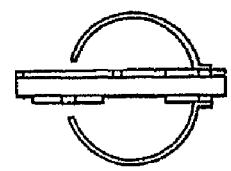
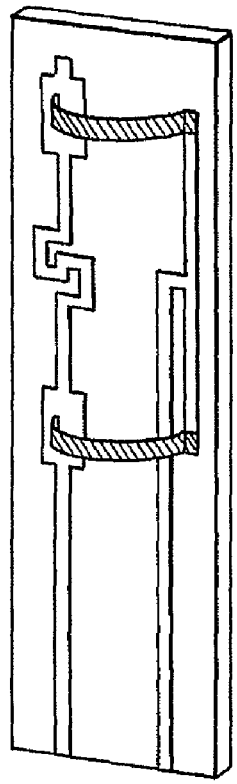
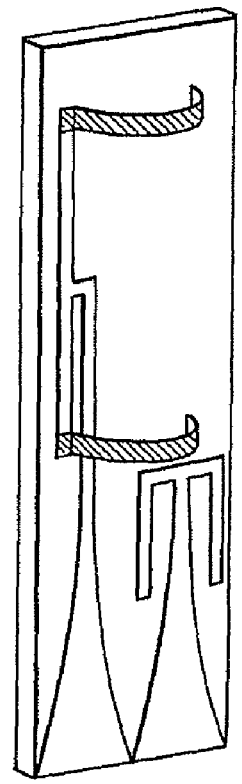

- 50: ANTENNA
- 51: ELEMENT
- 1: PRINTED CIRCUIT BOARD
- 31: FEED LINE
- 51: ELEMENT
- 32: FEED LINE
- 33: FEED LINE

- 52: ELEMENT
- 51: ELEMENT

- 52: ELEMENT
- 52: ELEMENT

DUAL POLARIZED ANTENNA

TECHNICAL FIELD

The present invention relates to a dual polarized antenna used in an MIMO (Multiple Input Multiple Output) technique.

BACKGROUND ART

A communication service that uses an MIMO technique, such as WiMAX (Worldwide Interoperability for Microwave Access), is now about to begin. The MIMO technique is a technique that receives a plurality of electric waves passed through a plurality of propagation paths so as to improve transmission rate and communication quality. In this technique, it is preferable to use two or more antennas and to reduce correlation between two antennas used in order to obtain a large effect.

An antenna having the following features is the most suitable for use as a terminal of a communication service using the WiMAX technique: having antenna elements with different polarizations to thereby reduce correlation between the antenna elements; having an omnidirectional radiation pattern to thereby receive a large number of multiply reflected waves effective for the MIMO; and having a compact size.

Patent Document 1: JP-A-2003-347822
Patent Document 2: JP-A-2005-167705
Patent Document 3: JP-A-07-086825
Patent Document 4: JP-A-09-064639
Patent Document 5: JP-A-10-107533

DISCLOSURE OF THE INVENTION

Problems to be Solved by the Invention

An invention disclosed in Patent Document 1 intends to provide a diversity antenna for LAN having high diversity effect for preventing drop in the reception intensity. To this end, a first antenna for transmitting/receiving a vertically polarized signal wave and a second antenna for transmitting/receiving a horizontally polarized signal wave are installed on the same dielectric substrate.

An invention disclosed in Patent Document 2 intends to provide a horizontal polarization omnidirectional array antenna having a simple structure, having high productivity, and capable of ensuring a mechanical strength suited to installation while realizing a sufficient omnidirectional property on a horizontal surface. To this end, a pair of semi-annular antenna elements is provided.

An invention disclosed in Patent Document 3 intends to provide a directional diversity antenna capable of receiving a radio-frequency signal of a quasi-microwave band. To this end, a λ/4 phase shift circuit is provided between radiating elements.

An invention disclosed in Patent Document 4 relates to a polarization diversity technique in which a plurality of receiving systems between which there no correlation exists with respect a polarized surface are provided and reception power in the receiving systems are switched to reduce a propagation variation and intends to provide a diversity antenna circuit capable of suppressing mutual interference during receiving operation of the respective receiving systems and accurately selecting one of the receiving systems that has a higher receiving sensitivity. To this end, an antenna for receiving signals in a horizontally polarized surface and an antenna for receiving signals in a vertically polarized surface are provided in conjunction with each other.

An invention disclosed in Patent Document 5 intends to provide an antenna made of a printed circuit board capable of reducing the size of the antenna itself by taking advantage of characteristics unique to a printed circuit board which is not found in an antenna mounted in the air. To this end, an antenna that is nearly equivalent to a Brown antenna is formed, in which a feed line pattern and outer conductor pattern on the printed circuit board correspond respectively to an inner conductor and an outer conductor of a coaxial cable of a Brown antenna and a ground pattern and an antenna element pattern correspond respectively to an earth line (ground side element) and a vertical conductor (HOT side element) of the Brown antenna.

In the case where a radio communication using the diversity technique or MIMO technique is performed, two antennas are generally used. In such a case, it is preferable to reduce correlation between the two antennas as much as possible and to reduce the sizes thereof.

An antenna apparatus used in communication using the MIMO technique conventionally includes an omnidirectional monopole antenna and an omnidirectional dipole antenna arranged side by side. In this method, the two antennas have the same directional characteristics, so that when the two antennas are disposed close to each other, correlation between them cannot be reduced to a sufficient level with the result that the effect of the MIMO transmission cannot sufficiently be obtained.

FIGS. 5A and 5B each show an example of an antenna of a related art. In the related art, two monopole antennas or two Brown antennas which are vertically polarized omnidirectional antennas are used and spaced away from each other. Both of the two antennas have vertical polarization and omnidirectional radiation characteristics, so that, when the two antennas are disposed close to each other, correlation between them becomes large with the result that the effect of the diversity or MIMO cannot sufficiently be obtained. When the two antennas are spaced away from each other, a larger space becomes necessary for installing the antennas. For example, assuming that the two antennas are separated by 10 wavelength in a 2.5 Ghz system, the distance between them exceeds 1 m, which is a considerably large size for a terminal, resulting in an increase in coaxial cable loss.

An object of the present invention is to provide a dual polarized antenna capable of achieving space saving and size reduction and capable of reducing correlation between antenna elements.

Means for Solving the Problems

According to the present invention, there is provided a dual polarized antenna constituted by a vertically polarized antenna and a horizontally polarized antenna formed on a printed circuit board and radiating two kinds of polarized waves, characterized in that the vertically polarized antenna has a configuration in which: a first microstripline is extended along a longitudinal direction of the printed circuit board from a lower portion of the printed circuit board; a first conductive radiating element is disposed at one end of the first microstripline; a phase delay circuit is serially connected to the first conductive radiating element; a second conductive radiating element is added to one end of the phase delay circuit; and a third conductive radiating element is added to a ground conductor which is disposed on a rear side of a surface of the printed circuit board on which the first conductive radiating element and first microstripline are connected at a corresponding portion thereof.

ADVANTAGES OF THE INVENTION

According to the present invention, a small-sized dual polarized antenna capable of forming an omnidirectional pattern in the horizontal plane can be provided.

BRIEF DESCRIPTION OF THE DRAWINGS

FIG. 1A is a side perspective view of a first embodiment of a dual polarized antenna according to the present invention;

FIG. 1B is a top view of the first embodiment of a dual polarized antenna according to the present invention;

FIG. 1C is a front surface perspective view of the first embodiment of a dual polarized antenna according to the present invention;

FIG. 1D is a rear surface perspective view of the first embodiment of a dual polarized antenna according to the present invention;

FIG. 2A is a side perspective view of a second embodiment of a dual polarized antenna according to the present invention;

FIG. 2B is a top view of the second embodiment of a dual polarized antenna according to the present invention;

FIG. 2C is a front surface perspective view of the second embodiment of a dual polarized antenna according to the present invention;

FIG. 2D is a rear surface perspective view of the second embodiment of a dual polarized antenna according to the present invention;

FIG. 3A is a side perspective view of a third embodiment of a dual polarized antenna according to the present invention;

FIG. 3B is a top view of the third embodiment of a dual polarized antenna according to the present invention;

FIG. 3C is a front surface perspective view of the third embodiment of a dual polarized antenna according to the present invention;

FIG. 3D is a rear surface perspective view of the third embodiment of a dual polarized antenna according to the present invention;

EXPLANATION OF REFERENCE SYMBOLS

Figure 4A:
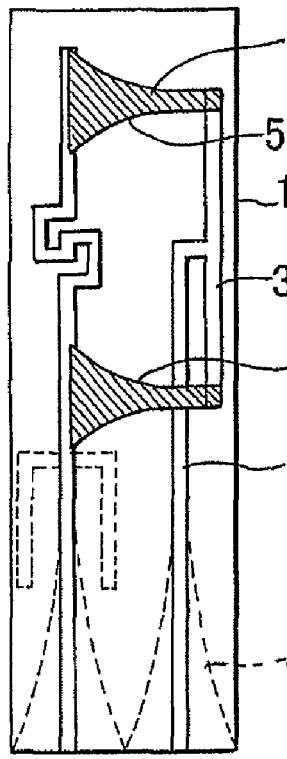
FIG. 4A is a side perspective view of a fourth embodiment of a dual polarized antenna according to the present invention.

1: Printed circuit board
10: Antenna
11: Element
12: Delay element
13: Element
14: Element
15: Feed line
16: Feed line
20: Antenna
21: Element
22: Element
23: Feed line
24: Feed line

BEST MODE FOR CARRYING OUT THE INVENTION

1) A dual polarized antenna according to the present invention is constituted by a vertically polarized antenna and a horizontally polarized antenna formed on a printed circuit board. The vertically polarized antenna has a configuration in which: a microstripline is extended along a longitudinal direction of the printed circuit board from a lower portion of the printed circuit board; a conductive radiating element having a length of about ¼ wavelength is disposed at one end of the microstripline; a 180-degree phase delay circuit is serially connected to the conductive radiating element; a conductive radiating element having a length of about ½ wavelength is added to one end of the phase delay circuit; and a conductive radiating element having a reverse U shape opened toward the lower side whose vertical portions have a length of about ¼ wavelength is added to a ground conductor which is disposed on a rear side of a surface of the printed circuit board on which the ¼ wavelength conductive radiating element and microstripline are connected at a corresponding portion thereof. The horizontally polarized antenna has a configuration in which: a microstripline is disposed in parallel to the microstripline of the vertically polarized antenna at a portion spaced from the microstripline of the vertically polarized antenna by a distance of about 0.1 to 0.3 wavelength and extended up to the level of the 180-degree phase delay circuit of the vertically polarized antenna; and semicircular arc-shaped radiating elements each having a length of about ¼ wavelength are disposed such that one ends thereof are connected to the microstriplines on both the front and rear sides of the printed circuit board so as to allow the surfaces of the circular arc portions to extend horizontally and such that the other ends thereof are positioned close to the 180-degree phase delay circuit.

2) A dual polarized antenna having a vertically polarized antenna having the same configuration as that of 1) and a horizontally polarized antenna having a configuration in which: a microstripline is disposed in parallel to the microstripline of the vertically polarized antenna at a portion spaced from the microstripline of the vertically polarized antenna by a distance of about 0.1 to 0.3 wavelength and extended up to the level of the 180-degree phase delay circuit of the vertically polarized antenna of 1), as in the case of the configuration of 1); the microstripline is oriented and slightly extended horizontally toward the side surface of the printed circuit board from the portion corresponding to the phase delay circuit; microstriplines each having a length of about ⅕ to ⅓ wavelength are disposed such that they diverge in both the upper and lower directions from the microstripline extending from the lower portion of the printed circuit board; and semicircular arc-shaped radiating elements each having a length of about ¼ wavelength are disposed such that one ends thereof are connected to the microstriplines each having a length of about ⅕ to ⅓ on both the front and rear sides of the printed circuit board so as to allow the surfaces of the circular arc portions to extend horizontally and such that the other ends thereof are positioned close to the conductive radiating elements of the vertically polarized antenna.

3) The width of the conductive radiating element of the vertical polarized antenna of the dual polarized antenna of 2) is increased.

4) The width of one end of the semicircular arc radiating element of the horizontally polarized antenna of the dual polarized antenna of 2) and 3) is increased in a tapered manner.

As described above, the dual polarized antenna according to the present invention is constituted by a vertically polarized antenna and a horizontally polarized antenna formed on a printed circuit board. The vertically polarized antenna has a configuration in which: a microstripline is extended along the longitudinal direction of the printed circuit board from the lower portion of the printed circuit board; a conductive radiating element having a length of about ¼ wavelength is disposed at one end of the microstripline; a 180-degree phase delay circuit is serially connected to the conductive radiating element; a conductive radiating element having a length of about ½ wavelength is added to one end of the phase delay circuit; and a conductive radiating element having a reverse U shape opened toward the lower side whose vertical portions have a length of about ¼ wavelength is added to a ground conductor which is disposed on the rear side of the surface of the printed circuit board on which the ¼ wavelength conductive radiating element and microstripline are connected at a corresponding portion thereof. The horizontally polarized antenna has a configuration in which: a microstripline is disposed in parallel to the microstripline of the vertically polarized antenna at a portion spaced from the microstripline of the vertically polarized antenna by a distance of about 0.1 to 0.3 wavelength; and a semicircular arc-shaped radiating element having a length of about ¼ wavelength is connected to the microstripline such that the surfaces of the circular arc portion extends horizontally.

Preferred embodiments for practicing the present invention will be described in detail below with reference to the accompanying drawings.

A dual polarized antenna according to the present invention is an antenna employed in communication using a MIMO technique. In recent years, the MIMO technique is adopted in a communication system using a WiMAX technique, and by employing a multibeam antenna according to the following embodiments, the MIMO technique can effectively be leveraged.

The MIMO is a technique that uses a plurality of antennas respectively on the transmitting and receiving sides and performs signal transmission using a plurality of different propagation paths so as to increase transmission rate. In this case, it is preferable that correlation among the plurality of antennas used respectively on the transmitting and receiving sides be small. For example, in the case where two antennas are used on the receiving side, they are spaced away from each other as far as possible so that correlation between them becomes small.

The dual polarized antenna according to the present invention is constituted by combining two types of antennas: one is a vertically polarized antenna and the other is a horizontally polarized antenna. The two antennas, vertically and horizontally polarized antennas, are not electrically coupled to each other in theory, so that correlation between them becomes significantly small. Thus, the dual polarized antenna is considered to be best suited for communication using the MIMO technique.

Generally, in the case where the two antennas are disposed close to each other, radiating elements of the antennas are brought physically close to each other, making it difficult to adjust impedance matching. In this case, however, by disposing only portions corresponding to horizontally and vertically polarized radiating elements of the two antennas close to each other while keeping feed portions and feed line portions thereof away from each other, satisfactory characteristics can be obtained.

With this configuration, the two antennas with different polarizations form an omnidirectional pattern in the horizontal plane. As a result, correlation between the two antennas becomes significantly small. Further, since the two antennas are disposed close to each other, the size of the entire antenna can be reduced.

By employing the two antennas between which no correlation exists in communication using a diversity technique or MIMO technique, it is possible to stabilize line power level to thereby improve line quality or transmission rate.

FIGS. 1A to 1D are configuration diagrams showing a first embodiment of the dual polarized antenna according to the present invention. FIG. 1A is a side perspective view, FIG. 1B is a top view, FIG. 1C is a front surface perspective view, and FIG. 1D is a rear surface perspective view.

The antenna according to the present embodiment includes antennas 10 and 20 arranged on a printed circuit board 1.

The antenna 10 is constituted by an element 11, a delay element 12, an element 13 which are formed on the printed circuit board 1 as conductive patterns and serially connected to one another. The antenna 10 is connected to a feed line 15. On the rear surface of the printed circuit board 1, a feed line 16 formed as a conductive pattern is disposed. The feed lines 15 and 16 make a pair on both front and rear sides of the printed circuit board 1 to constitute a microstripline. The upper side width of the feed line 16 is comparable or slightly larger than the width of the feed line 15. That is, the feed line 16 serves almost as a balanced transmission line on its upper side. The width of the feed line 16 becomes wider in a tapered manner toward the lower end of the feed line 16. That is, the feed line 16 serves as a perfectly unbalanced microstripline on its lower side. To the upper end of the feed line 16, a reverse U shape element 14 is connected.

The widths of the elements 13 and 14 are set to about ¼ wavelength, respectively, and thus the elements 13 and 14 electrically operate like a sleeve antenna. The width of the element 11 is set to about ½ wavelength and thus a current having the same phase as a current in the element 13 is distributed over the element 11. That is, the electrical width of the delay element 12 is also set to about ½ wavelength, causing a high-frequency current passing through the delay element 12 to be delayed by 180° in phase, whereby the phase of a high-frequency current in the elements 11 and 13 becomes the same. As a result, the phase of an electric wave radiated from the element 11, element 13, and element 14 becomes the same in a transverse direction, whereby a vertically polarized electric wave having omnidirectional pattern in the horizontal direction is radiated.

The antenna 20 is constituted by elements 21 and 22 each formed as a semicircular arc-shaped conductive plate, a feed line 23 formed on the front surface of the printed circuit board 1 as a conductive pattern, and a feed line 24 formed on the rear side thereof as a conductive pattern. The elements 21 and 22 are connected to the upper portions of the feed lines 23 and 24, respectively, by soldering. The elements 21 and 22 are arranged in a pair-wise fashion horizontally with respect to the printed circuit board 1 to assume substantially a circular shape as viewed from above. The feed lines 23 and 24 make a pair on both front and rear sides of the printed circuit board 1 to constitute a microstripline. The upper side width of the feed line 24 is comparable or slightly larger than the width of the feed line 23. That is, the feed line 24 serves almost as a balanced transmission line on its upper side. The width of the feed line 24 gradually increases toward the lower end of the feed line 24. That is, the feed line 24 serves as a perfectly unbalanced microstripline on its lower side.

The elements 21 and 22 have a length of about ¼ wavelength, respectively, and are configured to have a shape like one obtained by rounding a horizontal dipole into a circular arc shape. With this configuration, an omnidirectional horizontally polarized radiation pattern can be obtained.

The feed lines 15 and 23 are spaced away from each other by a distance of about 0.1 to 0.3 wavelength depending on the wavelength used.

FIGS. 2A to 2D are configuration diagrams showing a second embodiment of the dual polarized antenna according to the present invention. FIG. 2A is a side perspective view, FIG. 2B is a top view, FIG. 2C is a front surface perspective view, and FIG. 2D is a rear surface perspective view.

The configuration of the dual polarized antenna shown in FIGS. 2A to 2D differs from that of the dual polarized antenna shown in FIGS. 1A to 1D in that an antenna 30 is disposed in place of the antenna 20. The antenna 30 includes two sets of a pair of elements 21 and 22. The two sets of upper and lower elements are connected to each other, respectively, by feed lines 31 formed on the front/rear surfaces of the printed circuit board 1 and guided to the lower end portions of the printed circuit board 1 by feed lines 32 and 33. That is, power is fed in parallel to each pair of upper and lower elements 21 and 22 by the feed line 31. The distance between the upper and lower elements 21 is set to 0.4 to 0.7 wavelength. When measured from the junction of the feed lines 31 and 32, the distance to the upper or lower element 21 is ⅕ to ⅓ wavelength.

FIGS. 3A to 3D are configuration diagrams showing a third embodiment of the dual polarized antenna according to the present invention. FIG. 3A is a side perspective view, FIG. 3B is a top view, FIG. 3C is a front surface perspective view, and FIG. 3D is a rear surface perspective view.

The configuration of the dual polarized antenna shown in FIGS. 3A to 3D differs from that of the dual polarized antenna shown in FIGS. 2A to 2D in that an antenna 40 is disposed in place of the antenna 10. The antenna 40 differs from the antenna 10 in that elements 41 and 43 are used in place of the elements 11 and 13, respectively. The elements 41 and 43 have a larger width than that of the elements 11 and 13 at their center portions. By increasing the width of the element, wideband characteristics can be obtained.

Figure 4B:
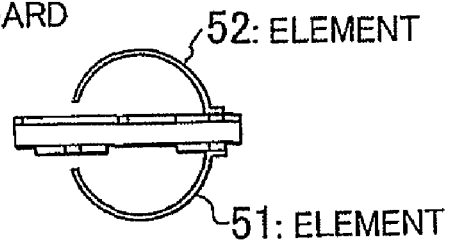
FIG. 4B is a top view of the fourth embodiment of a dual polarized antenna according to the present invention.
Figure 4C:
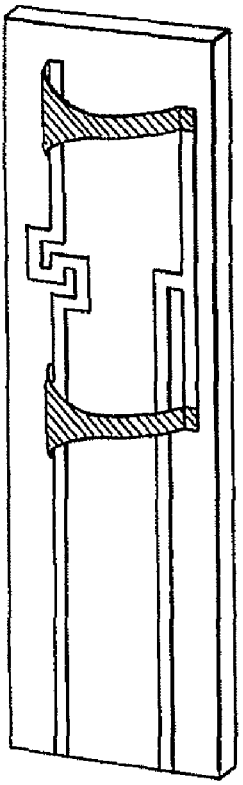
FIG. 4C is a front surface perspective view of the fourth embodiment of a dual polarized antenna according to the present invention.
Figure 4D:
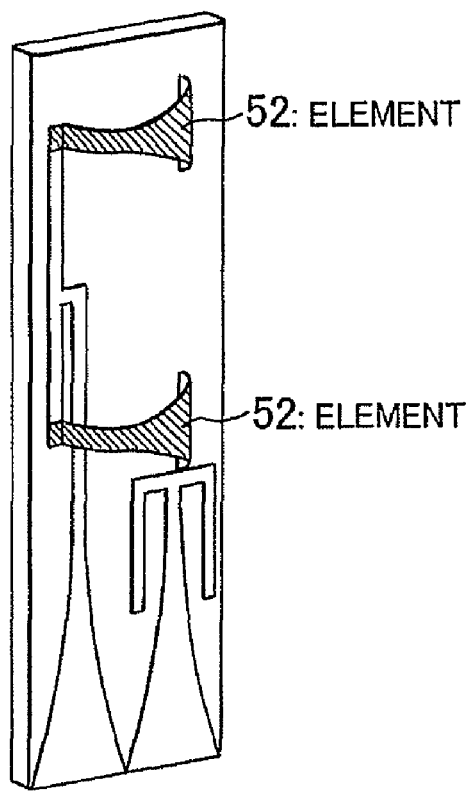
FIG. 4D is a rear surface perspective view of the fourth embodiment of a dual polarized antenna according to the present invention.
Figure 5A:
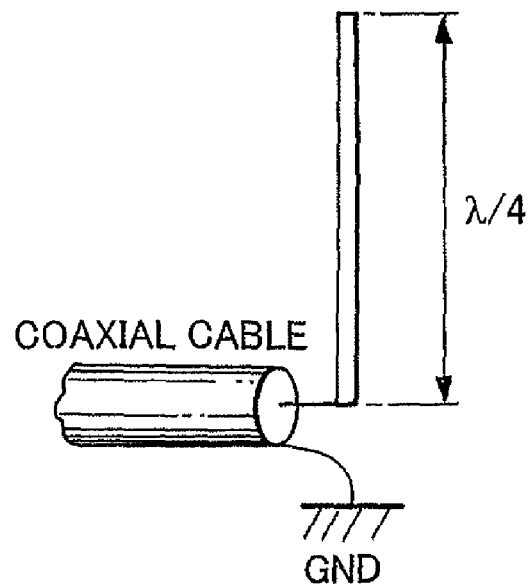
FIG. 5A is a view showing an example of a monopole antenna of a related art.
Figure 5B:
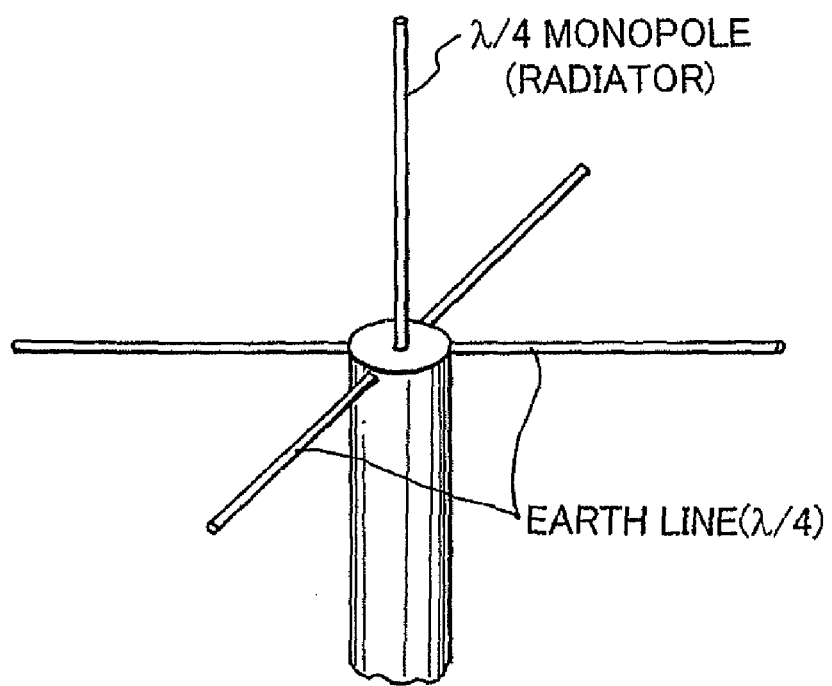
FIG. 5B is a view showing an example of a Brown antenna of a related art.

FIGS. 4A to 4D are configuration diagrams showing a fourth embodiment of the dual polarized antenna according to the present invention. FIG. 4A is a side perspective view, FIG. 4B is a top view, FIG. 4C is a front surface perspective view, and FIG. 4D is a rear surface perspective view.

The configuration of the dual polarized antenna shown in FIGS. 4A to 4D differs from that of the dual polarized antenna shown in FIGS. 2A to 2D in that an antenna 50 is disposed in place of the antenna 20. The antenna 50 differs from the antenna 20 in that elements 51 and 52 are used in place of the elements 21 and 22, respectively. The widths of one ends of the elements 51 and 52 become wider in tapered manner toward both the upper and lower directions. With this configuration, wideband characteristics can be obtained.

This application is based upon and claims the benefit of priority from prior Japanese Patent Application No. 2007-104837 (filed Apr. 12, 2007) under the Paris Convention, the entire contents of which are incorporated herein by reference.

Although the exemplary embodiments of the present invention have been described in detail, it should be understood that various changes, substitutions and alternatives can be made without departing from the spirit and scope of the invention as defined by the appended claims. Further, it is the inventor's intent to retain all equivalents of the claimed invention even if the claims are amended during prosecution.

INDUSTRIAL APPLICABILITY

The present invention can be utilized as a base station antenna or terminal antenna using a WiMax or MIMO technique.

The invention claimed is:

1. A dual polarized antenna constituted by a vertically polarized antenna and a horizontally polarized antenna formed on a printed circuit board and radiating two kinds of polarized waves, comprising:
the vertically polarized antenna having a configuration in which: a first microstripline is extended along a longitudinal direction of the printed circuit board from a lower portion of the printed circuit board; a first conductive radiating element is disposed at one end of the first microstripline; a phase delay circuit is serially connected to the first conductive radiating element; a second conductive radiating element is added to one end of the phase delay circuit; and a third conductive radiating element is added to a ground conductor which is disposed on a rear side of a surface of the printed circuit board on which the first conductive radiating element and first microstripline are connected at a corresponding portion thereof.

2. The dual polarized antenna according to claim 1, wherein the length of the first conductive radiating element is set to about ¼ wavelength.

3. The dual polarized antenna according to claim 1, wherein the phase delay of the phase delay circuit is set to 180°.

4. The dual polarized antenna according to claim 1, wherein the length of the second conductive radiating element is set to about ½ wavelength.

5. The dual polarized antenna according to claim 1, wherein the third conductive radiating element has a reverse U shape opened toward the lower side, and the length of each of the vertical portions of the U shape is set to about ¼ wavelength.

6. The dual polarized antenna according to 1, comprising:
the horizontally polarized antenna having a configuration in which: a second microstripline is disposed in parallel to the first microstripline of the vertically polarized antenna and extended up to the level of the phase delay circuit of the vertically polarized antenna; and semicircular arc-shaped radiating elements are connected to one ends of the second microstriplines on both the front and rear sides of the printed circuit board.

7. The dual polarized antenna according to claim 6, wherein the second microstripline is spaced away from the first microstripline by a distance of about 0.1 to 0.3 wavelength.

8. The dual polarized antenna according to claim 6, wherein each of the semicircular arc-shaped radiating elements has a semicircular arc shape with a length of about ¼ wavelength and is disposed such that one end thereof is connected to the second microstripline so as to allow the surface of the circular arc portion to extend horizontally and such that the other end thereof is positioned close to the phase delay circuit.

9. The dual polarized antenna according to claim 1, comprising:
the horizontally polarized antenna having a configuration in which: a third microstripline is disposed in parallel to the first microstripline of the vertically polarized antenna, extended up to the level of the phase delay circuit of the vertically polarized antenna, oriented and slightly extended horizontally toward the side surface of the printed circuit board from the portion corresponding to the phase delay circuit; fourth and fifth microstriplines having the same length are disposed such that they diverge in both the upper and lower directions from the third microstripline; and semicircular arc-shaped radiating elements each with a length of about ¼ wavelength are disposed such that one ends thereof are connected to the fourth and fifth microstriplines on both the front and rear sides of the printed circuit board so as to allow the surfaces of the circular arc portions to extend horizontally and such that the other ends thereof are positioned close to the conductive radiating elements of the vertically polarized antenna.

10. The dual polarized antenna according to claim 9, wherein the third microstripline is spaced away from the microstripline of the vertically polarized antenna by a distance of about 0.1 to 0.3 wavelength.

11. The dual polarized antenna according to claim 9, wherein the length of the fifth microstripline is set to about ⅕ to ⅓ wavelength.

12. The dual polarized antenna according to claim 9, wherein the width of the conductive radiating element of the vertical polarized antenna is increased.

13. The dual polarized antenna according to claim 9, wherein the width of one end of the semicircular arc radiating element of the horizontally polarized antenna is increased in a tapered manner.

\* \* \* \* \*